US008589589B2

(12) United States Patent
Clemm et al.

(10) Patent No.: US 8,589,589 B2
(45) Date of Patent: *Nov. 19, 2013

(54) METHOD AND SYSTEM FOR CREATING AN OVERLAY STRUCTURE FOR MANAGEMENT INFORMATION BASES

(75) Inventors: Alexander Clemm, Los Gatos, CA (US); Narayana Hosdurg Pai, Bangalore (IN); Rohit Mehendiratta, Bangalore (IN); Zbigniew W. Blaszczyk, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/028,792

(22) Filed: Feb. 16, 2011

(65) Prior Publication Data

US 2011/0138030 A1 Jun. 9, 2011

Related U.S. Application Data

(63) Continuation of application No. 11/329,204, filed on Jan. 10, 2006, now Pat. No. 7,904,588.

(51) Int. Cl.
| | |
|---|---|
| G06F 15/173 | (2006.01) |
| G06F 15/16 | (2006.01) |
| G06F 17/18 | (2006.01) |
| G06F 19/00 | (2011.01) |
| G06F 11/30 | (2006.01) |
| G06F 12/14 | (2006.01) |
| H03F 1/26 | (2006.01) |
| H04B 15/00 | (2006.01) |

(52) U.S. Cl.
USPC ........... 709/238; 709/218; 709/230; 709/236; 709/246; 709/249; 709/223; 709/227; 709/228; 702/181; 702/184; 702/189; 713/190; 713/194

(58) Field of Classification Search
USPC ......... 709/238, 218, 230, 236, 246, 249, 223, 709/227, 228; 702/181, 184, 189; 713/190, 713/194
See application file for complete search history.

(56) References Cited

U.S. PATENT DOCUMENTS

| | | | |
|---|---|---|---|
| 5,864,865 | A | 1/1999 | Lakis |
| 5,951,649 | A | 9/1999 | Dobbins et al. |
| 2002/0161935 | A1 | 10/2002 | Blaisdell |
| 2005/0278692 | A1 | 12/2005 | Sridhar et al. |
| 2006/0230060 | A1 | 10/2006 | Salgado |

OTHER PUBLICATIONS

Herur and Ray, "Management of Databases Using SNMP: A Framework for a Unified Database MIB," Western Sydney Univ., Nepean, NSW, Australia: Information Networking, 1998 (ICOIN-12) Proceedings, Twelfth International Conference, Publication Date: Jan. 21-23, 1998, on pp. 29-32, Number of pp. xviii+731; Meeting Date: Jan. 21-23, 1998; Location: Tokyo; Digital Object Identified: 10.1109/ICOIN.1998.648348, Posted online. Aug. 6, 2002 21:36:01.0.

Stamatelopoulos et al., "A Scaleable, Platform-Based Architecture for Multiple Domain Network Management", Department of Electrical and Computer Engineering, National Technical University of Athens, Greece; Communications, 1995, ICC 95 Seattle, Gateway to Globaliation, 1995 IEEE International Conference, Publication Date: Jun. 18-22, 1995, vol. 3 on pp. 1453-1458, vol. 3, meeting date: Jun. 18-22, 1995, Location: Seattle, WA, Digital Object Identified: 10.1109/ICC.1995.524444.

*Primary Examiner* — Asad Nawaz
*Assistant Examiner* — Stephanie Chang
(74) *Attorney, Agent, or Firm* — Fish & Richardson P.C.

(57) ABSTRACT

A method, a system, and an apparatus are provided for organizing management information bases (MIB) in a network. A table, associated with an overlay MIB structure, is populated with entries. Each entry defines an object identifier (OID) of a mount point and an OID of a mount target. A selection is made between the existing OIDs and OIDs corresponding to a MIB overlay. When management communication refers to managed objects, they can be referred to in terms of OIDs defined by the MIB overlay, as an alternative to their existing OIDs. An agent infrastructure is defined to support the MIB overlay structure.

25 Claims, 7 Drawing Sheets

METHOD AND SYSTEM FOR CREATING AN OVERLAY STRUCTURE FOR MANAGEMENT INFORMATION BASES

CROSS REFERENCE TO RELATED APPLICATIONS

This application is a continuation, and claims the benefit of priority under 35 USC 120, of U.S. application Ser. No. 11/329,204, filed Jan. 10, 2006. The disclosure of the prior application is considered part of, and is incorporated by reference in, the disclosure of this application.

BACKGROUND OF THE INVENTION

1. Field of Invention

Embodiments of the present invention relate, in general, to network management systems. More specifically, embodiments of the present invention relate to methods and systems for organizing Management Information Bases (MIB).

2. Description of the Background Art

A Network Management System (NMS) is a combination of hardware and software tools and applications that assists a network administrator in monitoring and maintaining a network comprising a plurality of managed network devices. The NMS gets information on managed devices from one or more management information bases that are maintained by a piece of software on each managed device referred to as a management agent. A Management Information Base (MIB) is a collection of the information, pertinent to network management, which is conceptually in an organized tree hierarchy. The MIB is a set of variables or a database that a gateway running Simple Network Management Protocol (SNMP) or other network management protocols maintains. SNMP MIB defines variables needed by the SNMP protocol to monitor and control network devices in a network. Network managers fetch or store information into these variables.

The SNMP MIB includes managed objects (or MIB objects) that provide one of many operational characteristics of a managed network device. For example, one MIB object specifies bandwidth usage or the number of messages sent and received at a managed device. Each managed object is identified by a unique object identifier (OID). The OID uniquely identifies an authoritatively named object regardless of the semantics (for example, a standards document, an ASN.1 module, and so on) associated with the object.

MIB objects are defined across different MIB modules. These MIB modules define management information that is closely related or associated with the same managed property of the managed device. Typically, MIB modules are defined at different points of time by different developers. Also, different organizations may own MIB module definitions so it is desirable to keep the MIB module definitions modular and reusable. The modular structure results in some aspects being excluded in one MIB module and addressed in others. Therefore, closely related MIB objects are often scattered across the object identifier (OID) tree.

MIB objects can be grouped in tables. For each table, one or more suitable object types are specified, which must occur as a column of the table. A specific table row can be accessed by entering an index. An index is a key for selecting a unique table row. In some cases, MIB modules refer to each other by augmenting tables or sharing indices between tables to indicate that the MIB modules are related. However, the instance identifiers remain in separate sub-trees on the basis of separate MIB module definitions. As a result, the complete management information on a device is not available at one place due to which additional development effort is required, because the developer needs to understand the various aspects that really belong together. This prevents simple lightweight applications from being effective, such as MIB browsers that leave interpretation of data to the users, as the users need to be aware of all the different pieces of management information, and cannot find them combined in one place. To deal with the complexities introduced by separate MIB modules, there is a requirement for sophisticated applications that are, unfortunately relatively costly, slow and difficult to maintain.

Often the NMS must gather management information from different places across the object-identifier tree. It may be inefficient for the NMS to gather information located in different MIB modules. Further, different MIB module definitions result in inconsistency in the way in which MIB for different devices and device features are structured. Thus, the users and application developers must be familiar with the structure and purpose of each subtree in the MIB, on an individual basis, which is inefficient and unnecessarily increases network management costs. Further still, conventional efforts to structure MIB focus on grouping management information when MIB modules are originally defined and do not allow the creation of alternative structures for MIB modules.

DETAILED DESCRIPTION OF EMBODIMENTS OF THE INVENTION

Embodiments of the present invention provide a method and a system for creating an overlay structure for Management Information Bases (MIB) in a network that organizes the MIB information and groups information that is otherwise scattered across an object identifier (OID) tree. Various embodiments of the invention provide an overlay that introduces an alternative logical structure of the object identifier tree.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
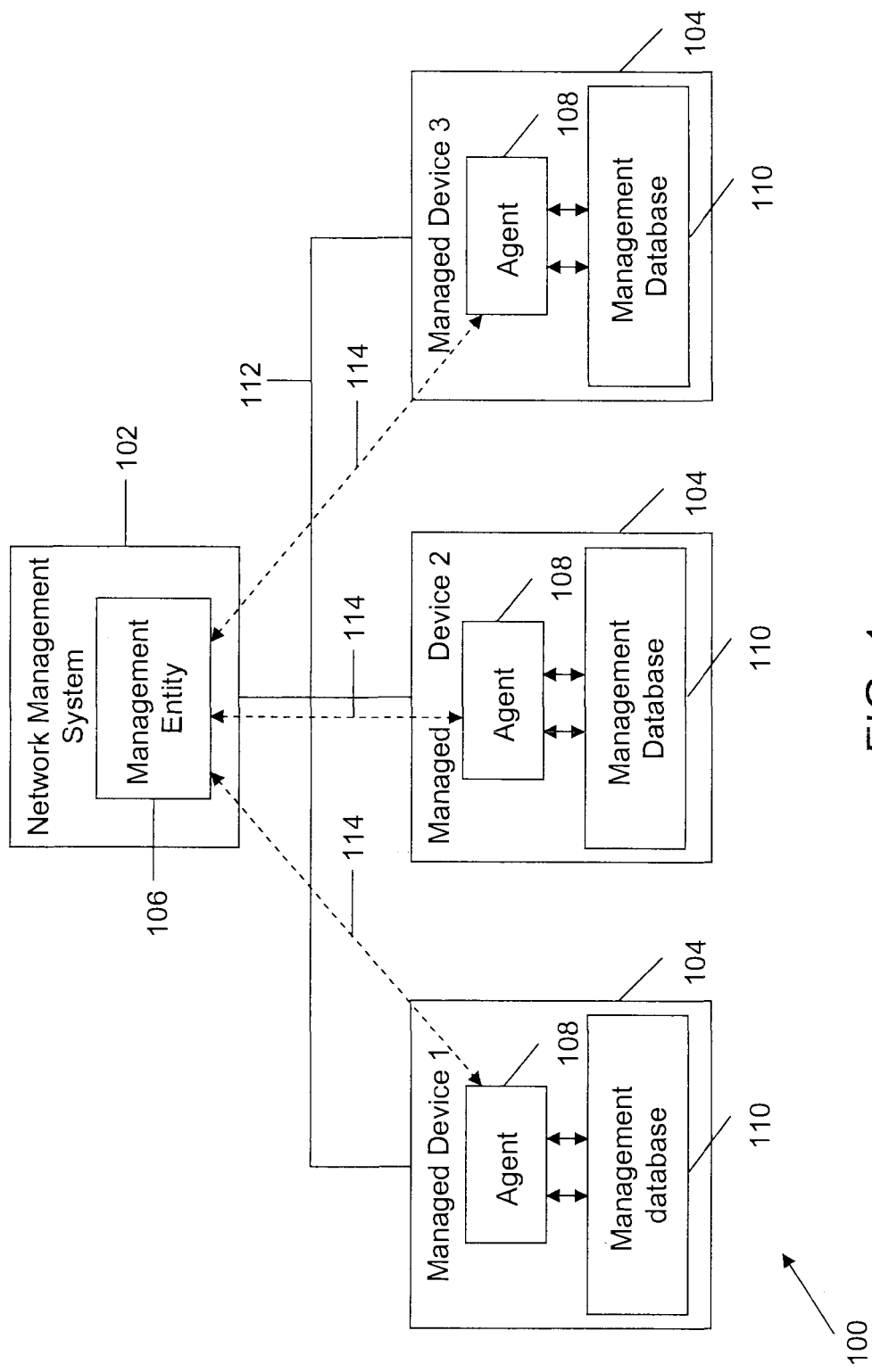
FIG. 1 illustrates an environment for implementing an exemplary embodiment of the present invention.

Referring now to the drawings more particularly by reference numbers, a simplified embodiment illustrates an environment for implementing the present invention in FIG. 1, where network 100 includes network management system (NMS) 102, plurality of managed devices 104, management entity 106, plurality of agents 108 and management database 110. Network 100 may be the Internet, a Local Area Network (LAN), a Wide Area Network (WAN), an ethernet or a combination of two or more of these network types. NMS 102 includes a combination of hardware devices and distributed software modules that monitor and control network 100 in different areas such as performance management, configuration management and security management and the like. Managed devices 104 include network devices and/or network infrastructure devices such as data processing units, hosts, servers, mobile or telecommunication devices, and so forth. Examples of network infrastructure devices include gateways, switches, hubs, routers, wireless access devices and the like.

NMS 102 includes an application, management entity 106 that manages one or more of a specific type of the managed devices. It exchanges management information on all features of each managed device individually. In one embodiment of the invention, an example of management entity 106 is a MIB browser.

Each managed device 104 includes agent 108. Agents 108 are software modules that run in managed devices 104, respectively. An agent collects management information related to the managed device, in the form of managed objects. Managed devices 104 also include management database 110, respectively. Management database 110 is a collection of management information stored in the form of managed objects. The managed objects are provided to management entity 106 by the respective agent 108 on request. In various embodiments of the invention, the managed objects are values for a number of variables, for example, the bandwidth usage, memory and CPU utilization, etc. by the device.

NMS 102 is connected to each of the plurality of managed devices through network medium 112. In one embodiment of the invention, network medium 112 is a physical medium, for example, a cable or fiber-optics. In another embodiment of the invention, network medium 112 is a wireless medium that connects the managed devices to NMS 102. NMS 102 and each of the plurality of managed devices 104 communicate with each other by using a network management protocol 114. Network management protocol 114 enables network communication, administration and control over the plurality of managed devices 104 by NMS 102. In an embodiment of the invention, network management protocol 114 is a Simple Network Management Protocol (SNMP). In other embodiments of the invention, other network management protocols such as Common Management Information Protocol (CMIP) may be used for communication, administration and control.

In an embodiment of the invention, network 100 has been illustrated with three managed devices 104, but one skilled in the art will understand that network 100 may include a plurality of such devices that is either less than or greater than the three illustrated managed devices 104.

Figure 2:
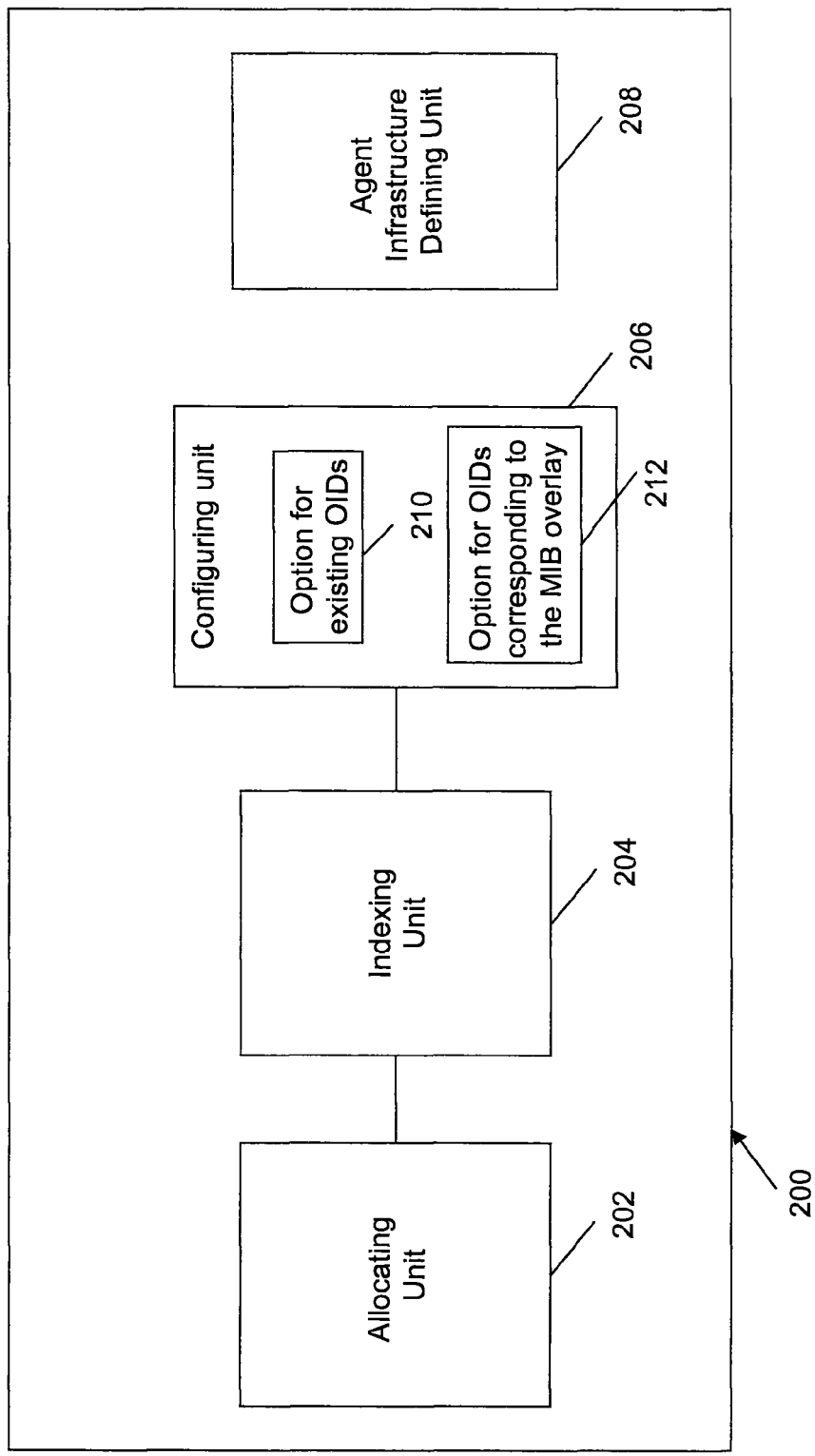
FIG. 2 illustrates a system for creating an overlay structure for Management Information Bases (MIB), in accordance with an exemplary embodiment of the invention.

FIG. 2 illustrates system 200 for creating an overlay structure for Management Information Bases (MIB), in accordance with an exemplary embodiment of the invention. A MIB overlay is defined through an overlay MIB that is introduced for that purpose. The overlay MIB provides data structures, specifically, a special purpose table that can hold the definition of the MIB overlay. A preferred way of defining the MIB overlay is through the overlay MIB; however, one skilled in the art will appreciate that there are other ways in which the MIB overlay could be defined and implemented. The MIB overlay is a means to introduce an overlay structure for SNMP MIB to allow for a logical and consistent grouping of management information within and across managed devices, using a concept of mount points for the object identifier tree.

In a preferred embodiment of the invention, an OID as specified in RFC2578 (Network Working Group, Editors of this version, K. McCloghrie, CISCO Systems, D. Perkins, SNMPinfo, J. Schoenwaelder, T U Braunschweig, Authors of previous version: J. Case, SNMP Research, K. McCloghrie, Cisco Systems, M. Rose, First Virtual Holdings, S. Waldbusser, International Network Services, "Structure of Management Information Version 2 (SMIv2)", STD: 58, Obsoletes: 1902, Category: Standards Track, April 1999), is used to identify nodes in the object identifier tree. The object identifier tree includes an organized hierarchy of numeric identifiers that identify managed objects, object specifications or a logical grouping of objects. The OID is a sequence of non-negative integer values formed by traversing the object identifier tree from a root to a node, concatenating the numeric identifiers along the way. Only leaf nodes in the object identifier tree are managed objects. In other words while every managed object is identified by a unique OID, not every OID is associated with a managed object. In other embodiments, different forms of object identification can be used.

The overlay MIB specifies the MIB overlay using the specific purpose table whose table entries specify the mapping between mount points and mount targets. A mount target is a valid OID that is contained in the object identifier space of the overlay MIB, and which points to a valid node within the object identifier tree. The mount point is an OID that allows mounting of the mount target underneath another OID. When an application references an OID containing a mount-point, agent 108 internally substitutes the mount-point's OID with the OID of the mount target. The table entries are read only; they are populated by the agent respectively by the managed device upon start up (the managed device determines the overlay structure).

As an extension, the MIB overlay may allow to define multiple overlays that contain conceptually a table of tables with overlays. One way of accomplishing this is to augment the table entries with an additional column reflecting the overlay OID.

System 200 includes allocating unit 202, indexing unit 204, configuring unit 206 and agent infrastructure defining unit 208. Allocating unit 202 creates a table associated with the MIB overlay structure. The table defines the MIB overlay. The table itself is part of the overlay MIB. Allocating unit 202 is a software module that allocates a memory for the storage of the table.

Indexing unit 204 populates the table with entries, where each entry defines an OID of a mount point and an OID of a mount target. The table entries are 'read only' for network users (that is, for users and applications). Indexing unit 204 is a software module that groups together one type of objects into one category and another type of objects into a second category and so on. Different categories have a plurality of mount points. The mount points point to the managed objects called mount targets. In an embodiment of the invention, indexing unit 204 populates the table at a time when a managed device is initialized.

Configuring unit 206 provides an option to a user for selecting between existing OIDs of the managed objects and OIDs corresponding to the MIB overlay. If the MIB overlay is defined, then there is a means for managed device 104 to tell if the MIB overlay should be considered in effect, or not. This ensures that managed device 104 knows which OIDs to use in notifications, the existing OIDs (that correspond to the existing MIB), or the OIDs corresponding to the MIB overlay. In case, several, alternative MIB overlays are defined, there is a means to inform managed device 104 which of the overlays to use. The multiple MIB overlays may be referred to by a specific name or identifier. This is configurable and the MIB overlay is referred to by a specific name. As depicted in FIG. 2, configuring unit 206 includes option for the existing OIDs 210 and option for the OIDs corresponding to the MIB overlay 212. In another embodiment of the invention, configuring unit 206 includes an option for selecting OIDs corresponding to multiple overlays. In various embodiments of the invention, option for the existing OIDs 210 and option for the OIDs corresponding to the MIB overlay 212 may be user interface. Configuring unit 206 is a software module that allows users to select whether agents 108 should use the existing OIDs or the OIDs corresponding to the MIB overlay (in case of multiple overlays: which one) when it comes to referencing OIDs, other than OIDs specifically requested in an SNMP request operation, for example, OIDs in variable bindings of notifications. The selection is based on the specific requirements of users for existing OIDs, OIDs corresponding to the overlay MIB, or OIDs corresponding to multiple overlays. Option for the existing OIDs 210 is selected by users when they want to use the existing OIDs, and option for the OIDs corresponding to the MIB overlay 212 is selected when users want to use the OIDs corresponding to the MIB overlay.

Agent infrastructure defining unit 208 defines an agent infrastructure to support the MIB overlay. The agent infrastructure is so defined for agents 108 to function when they receive a request, for an existing OID, or when agents 108 send a response to the request, or when agents 108 send a notification. In various embodiments of the invention, agent infrastructure defining unit 208 may be a combination of one or more software and hardware units. In one embodiment of the invention, agent infrastructure defining unit 208 is a software module that may spawn agents 108 to support the MIB overlay. Agent infrastructure defining unit 208 defines an agent infrastructure to support the MIB overlay so that agents 108 substitute an OID of a mount point with an OID of a mount target referenced by the mount point, on receiving a request for the OID of the mount target; agents 108 substitute the OID of the mount target with the OID of the mount point, while sending a response to the request; and agents 108 substitute other existing OIDs with the OIDs corresponding to the MIB overlay, when the MIB overlay is selected. Further, agent infrastructure defining unit 208 defines the agent infrastructure so that agents 108 substitute an OID of the mount target with the OID corresponding to the MIB overlay in case of a notification, when the MIB overlay is selected.

Figure 3:
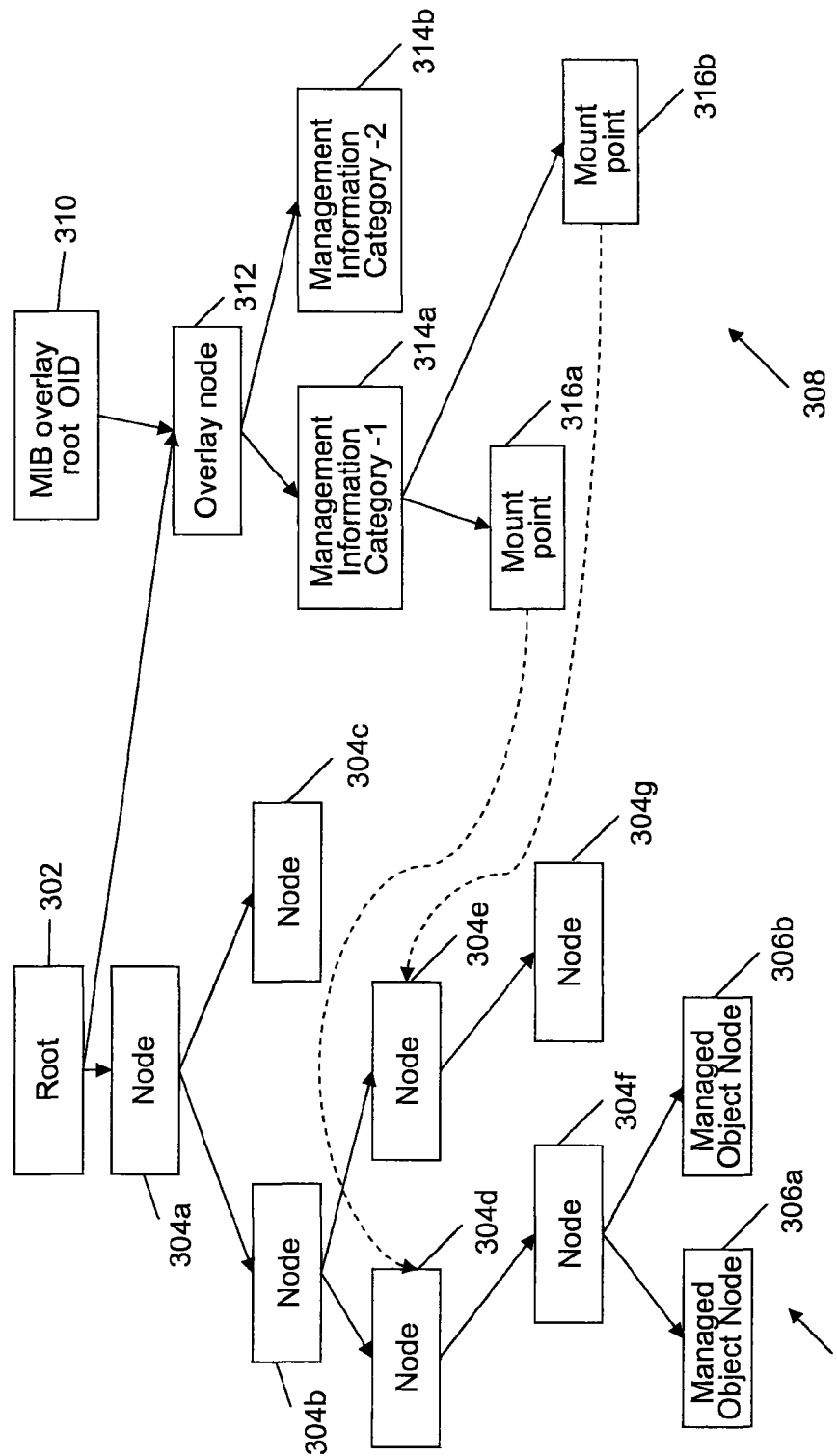
FIG. 3 illustrates a MIB overlay structure over existing MIB (which can be represented by an overlay MIB), in accordance with an exemplary embodiment of the invention.

FIG. 3 illustrates a MIB overlay (which can be represented by an overlay MIB) structure over the existing MIB, in accordance with an exemplary embodiment of the invention. As depicted in FIG. 3, existing object identifier tree 300 includes root 302, plurality of nodes 304 and plurality of managed object nodes 306. Root 302, nodes 304 and managed object nodes 306 are identifiers or labels in existing object identifier tree 300. As shown in FIG. 3, root 302 is the root of existing object identifier tree 300. However, root 302 may itself be a node that is several levels down in a 'global' object identifier tree. Some of nodes 304 identify a table, others an object specification, others a logical or abstract grouping. Typically, the leaves of existing object identifier tree 300 are the OIDs of the managed objects. The managed objects are all part of a MIB on the same agent. Overlay object identifier tree 308 subtends from MIB overlay root 310 with its own OID. Overlay object identifier tree 308 includes overlay node 312. Overlay object identifier tree 308 may introduce an overlay structure that further introduces a grouping of management information into management information categories 314a and 314b, which further point to a plurality of mount points 316. For example, management information category 314a includes a plurality of mount points 316a and 316b.

The MIB overlay structure introduces an 'aliasing' capability that allows applications to traverse MIB along an alternative object identifier tree, namely overlay object identifier tree 308. The MIB overlay structure allows the MIB objects to be accessed by using alternative OIDs in addition to the existing OIDs. As shown in FIG. 3, managed object nodes 306 can be accessed using the existing OIDs according to existing object identifier tree 300 or using the OIDs corresponding to the MIB overlay according to overlay object identifier tree 308. For example, managed object node 306a can be accessed using existing OID: 302.304a.304b.304d.304f.306a according to existing object identifier tree 300. Managed object node 306a can also be accessed along alternative path using overlay OID: 310.312.314a.316a.304f.306a according to overlay object identifier tree 308. Similarly, managed object node 306b can be accessed using existing OID: 302.304a.304b.304d.304f.306b according to existing object identifier tree 300. Managed object node 306b can also be accessed along alternative path using overlay OID: 310.312.314a.316a.304f.306b according to overlay object identifier tree 308. Therefore, an alternative path to access managed object nodes 306 is enabled through the MIB overlay structure. The existing OIDs are not changed or affected in any way. The MIB overlay structure is achieved by defining mount points 314 in overlay object identifier tree 308. Managed object nodes 306a and 306b serve as mount targets. The effect is that in management communication, the OID of the mount point is substituted by the OID of the mount target. This implies that when the OID is resolved, the prefix of the OID, respectively the portion of the OID that refers to a mount point, is substituted by the OID of the mount target. The suffix (the portion that comes after the mount point portion) remains intact. For example, as shown in FIG. 3, the mount point part in the overlay OID of managed object node 306a is 310.312.314a.316a.304f. While resolving and substituting the OID, the mount point part is substituted with mount target part 302.304a.304b.304d.304f. In an embodiment of the invention, MIB overlay structure is defined as a part of a table, which defines an overlay MIB, described in conjunction with FIG. 4.

Figure 4:
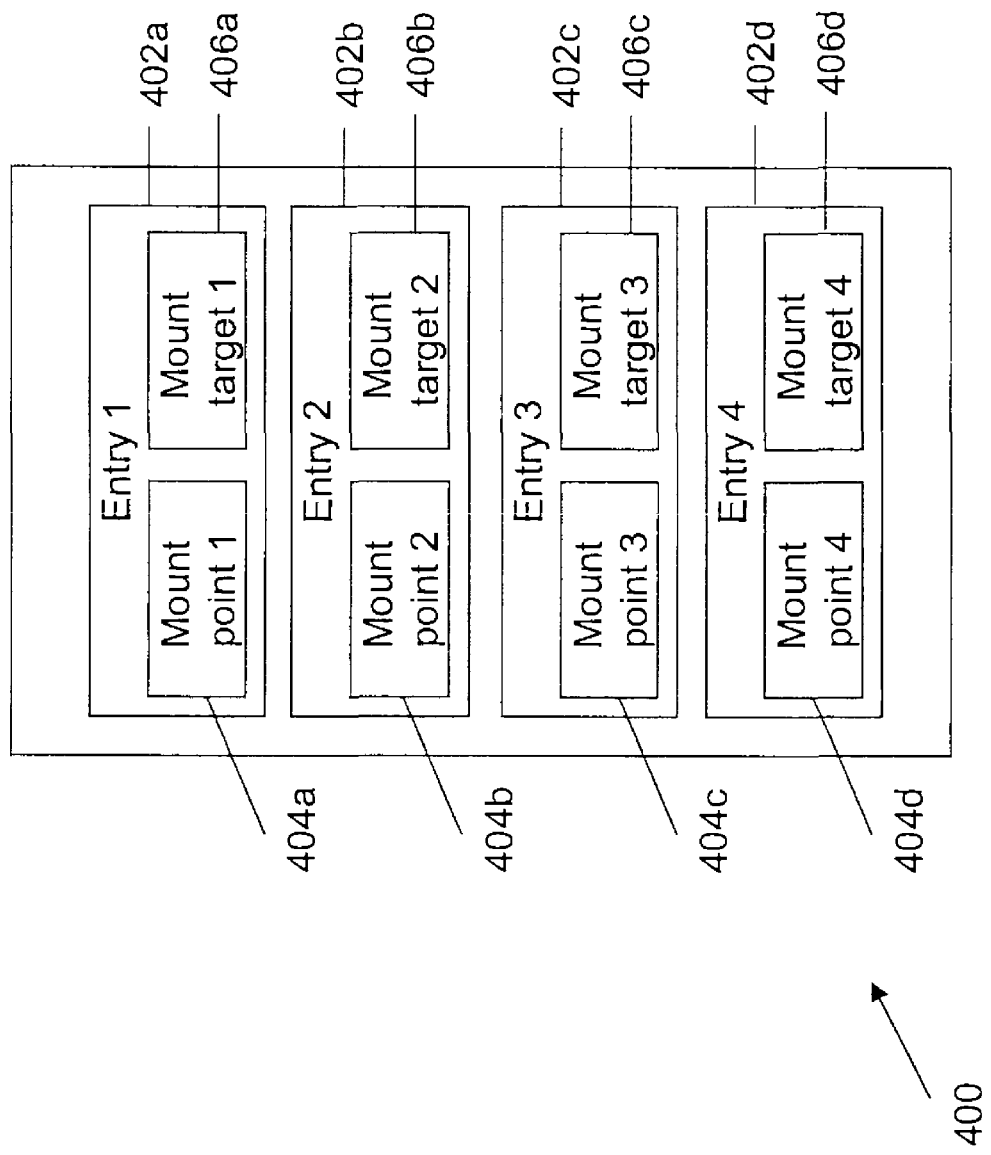
FIG. 4 illustrates a table associated with a MIB overlay structure, in accordance with an exemplary embodiment of the invention.

FIG. 4 illustrates table 400, associated with a MIB overlay structure, in accordance with an exemplary embodiment of the invention. Table 400 includes plurality of entries 402a, 402b, 402c and 402d that comprise mount points 404a, 404b, 404c and 404d and, mount targets 406a, 406b, 406c and 406d, respectively. Each mount point is mapped to a mount target. When any one of agents 108 receives a request for an OID, the request contains the OID that starts with the OID of a mount point. The mount point OID portion is then internally substituted with the OID of the mount target, to identify the object actually addressed by the request. The mount target OIDs are the OIDs corresponding to existing object identifier tree 300. The mount point OIDs are the OIDs corresponding to overlay object identifier tree 308. Agent 108 may still receive requests for managed objects with OIDs that do not match any mount point. In this case, no substitution takes place. In the event, when agent 108 generates a notification, if the MIB overlay is in effect and the OID of a mount target is affected, then the OID substitution between overlay object identifier tree 308 and existing object identifier tree 300 takes place. Agent 108 internally substitutes the mount point's OID with the OID of the mount target. The suffix portion is left untouched; only the portion of the OID referring to the mount point, the OID prefix, is substituted.

In an embodiment of the invention, entries 402a, 402b, 402c and 402d are 'read only' for users of network 100. In another embodiment of the invention, a network administrator may modify the table entries. In an embodiment of the invention, multiple MIB overlays are defined. A multiple MIB overlay includes a table of tables with overlays. In multiple MIB overlays, the table entries are augmented with an additional column, reflecting the OID corresponding to the overlay MIB.

Mount points 404a, 404b, 404c and 404d are defined so that they do not coincide with an existing OID or prefix thereof of a managed object that may also serve as mount targets 406a, 406b, 406c or 406d. In case the MIB overlays are defined using an overlay MIB, mount targets should (but do not have to) be defined in such a way that they are contained in the object identifier space of the overlay MIB. Mount targets should (but do not have to) be valid OIDs, that is, they should point to a valid node within the object identifier tree. Mount points are unambiguous, that is there is only one mount target per mount point. Further, each OID can be a mount target only once. Two different mount points are not allowed to have identical mount targets. This prevents ambiguity in relation to, which OID should be used in the response or the notification. However, two OIDs, where one is a prefix of the other can each be separate mount targets.

Figure 5:
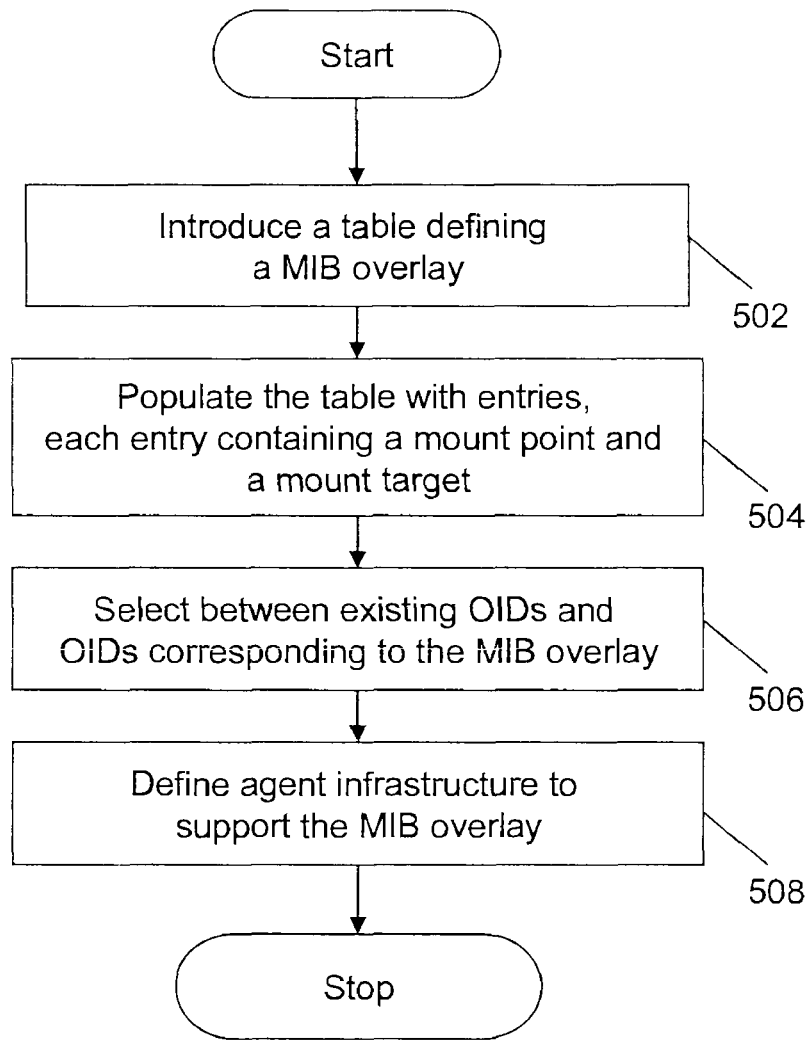
FIG. 5 is a flowchart illustrating a method for creating an overlay structure for MIB, in accordance with an exemplary embodiment of the invention.

FIG. 5 is a flowchart illustrating a method for creating an overlay structure for MIB, in accordance with an exemplary embodiment of the invention. At step 502, a table defining an overlay MIB is introduced by allocating unit 202. At step 504, the table is populated with entries by indexing unit 204. Each entry defines an OID of a mount point and an OID of a mount target. At step 506, selection is made between existing OIDs and OIDs corresponding to the MIB overlay by configuring unit 206, in one embodiment of the invention. In another embodiment of the invention, a MIB overlay is selected from multiple MIB overlays. The device may be configured to indicate whether or not the MIB overlay is in effect, and which one. This will affect which substitutions of OIDs need to be made while sending the response to the request or the notification. At step 508, an agent infrastructure, which supports the overlay structure for MIB, is defined by agent infrastructure defining unit 208.

Figure 6A:
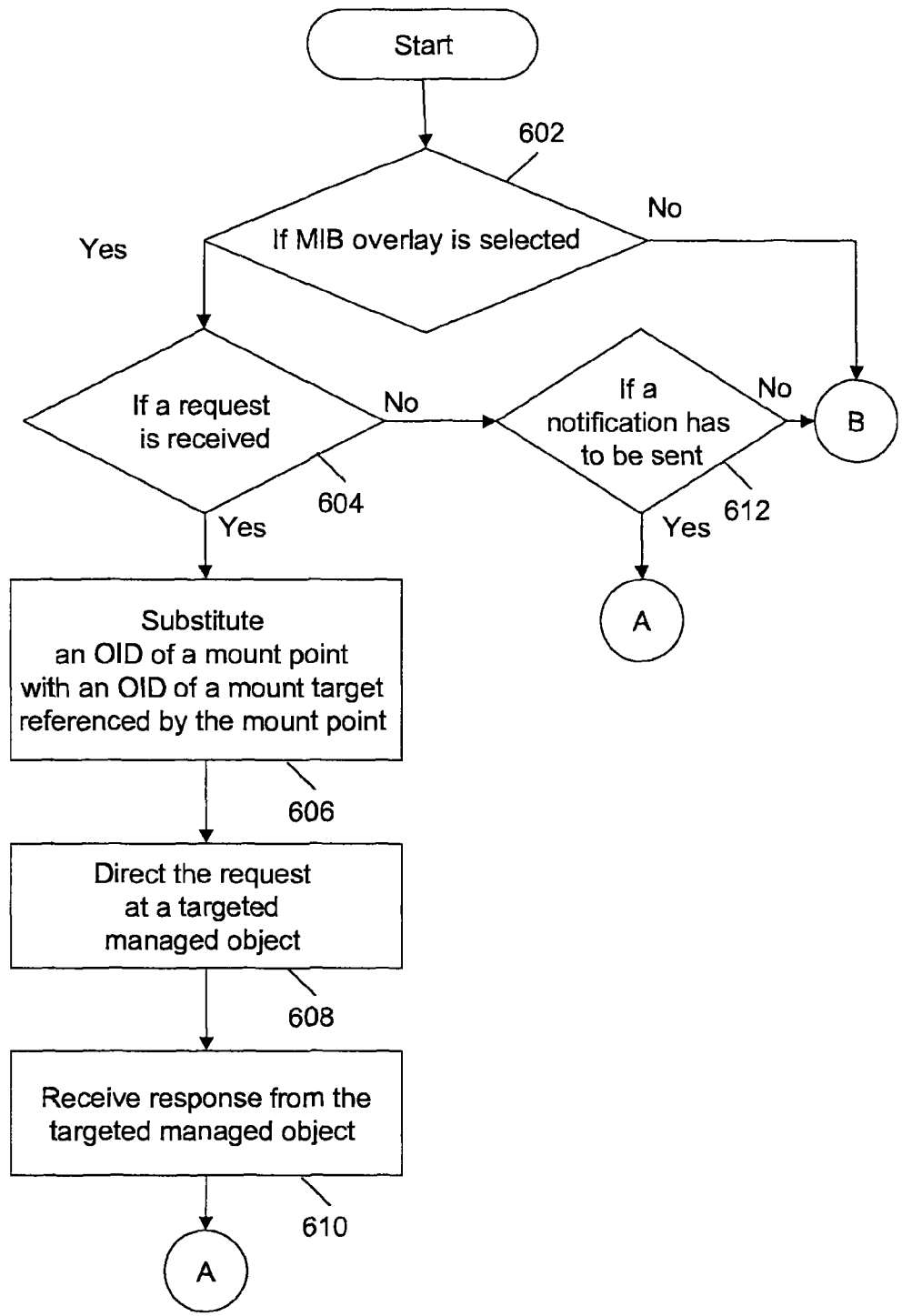
FIGS. 6a and 6b are flowcharts illustrating a method for defining an agent infrastructure, in accordance with an exemplary embodiment of the invention.
Figure 6B:
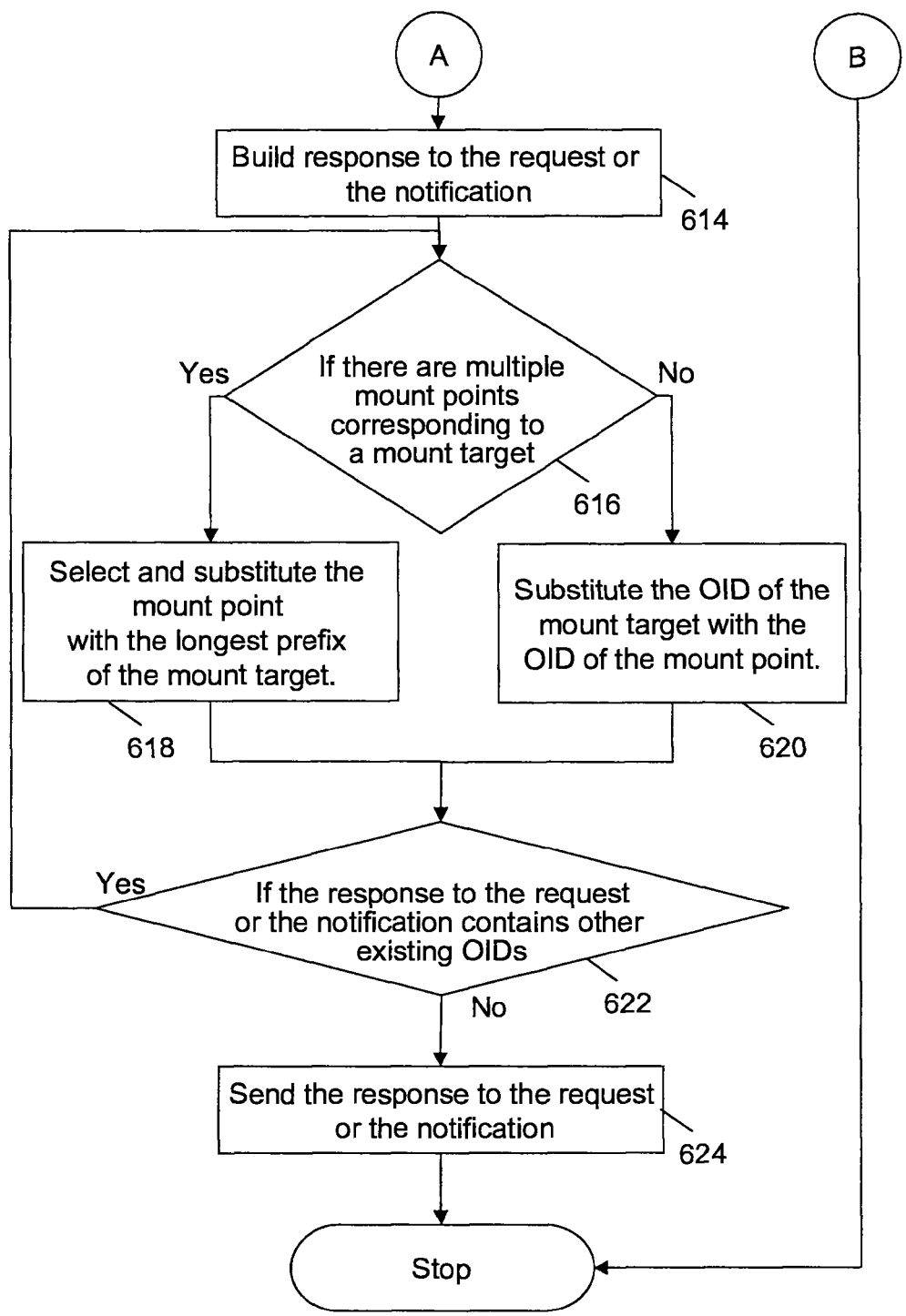

FIGS. 6a and 6b are flowcharts illustrating a method for defining an agent infrastructure, in accordance with an exemplary embodiment of the invention. At step 602, it is checked if the MIB overlay is selected by configuring unit 206. At step 604, it is checked if a request for an OID is received by the agent. The request contains the OID that starts with the OID of a mount point. If the request is received, then at step 606, the OID of a mount point is substituted with the OID of the mount target by agent 108. At step 608, the request is directed at a targeted managed object. The targeted managed object is the managed object referred to by the substituted OID. At step 610, a response to the request is received by the agent from the targeted managed object. In case the request is not received, then at step 612, it is checked if a notification has to be sent. Steps 604 and 612 are parallel steps representing two cases. The request is triggered by the user, whereas the notification is triggered by the agent or the managed device. The trigger for the notification is the agent infrastructure itself, based on a 'real-world' event occurrence. At step 614, a response to the request or the notification is built. At step 616, the agent checks for multiple mount points corresponding to a mount target. If there are multiple mount points, then, at step 618, the mount point with the longest prefix of the mount target is selected and substituted. If there are no multiple mount points, then at step 620, the OID of the mount target is substituted with the OID of the mount point. At step 622, it is checked if the response to the request or the notification contains other existing OIDs. Multiple managed objects (with multiple OIDs) can be contained in the same request, or the same notification. If the response to the request or the notification contains other existing OIDs, then steps 616 and, 618 or 620 are repeated. At step 624, the response to the request or the notification is sent by the agent. If the MIB overlay is not selected, the agent continues using existing OIDs.

In various embodiments of the invention, the overlay MIB structure is complemented by a reference overlay structure, owned by an organization for whose network the overlay MIB structure has been defined.

The embodiments of the invention provide an advantage of logically organizing management information. The MIB overlay structure provides greater consistency in structuring management information logically within MIB. Embodiments of the invention also provide to users of data-driven management applications such as MIB browsers, an advantage of better accessibility of MIB. Closely related managed objects may be accessed in one place by management applications, despite the managed objects being scattered in different MIB module definitions. The embodiments of the invention also provide the advantage that users can understand the role of every MIB object from its position in the MIB overlay. Further, the embodiments of the invention provide the advantage of greater efficiency to users and applications, which need to gather management information from multiple places across the object identifier tree. In particular, the embodiments of the invention provide the efficiency advantage with features that may allow for scoped retrieval of MIB information available with agent implementation extensions. Moreover, the embodiments of the invention provide an advantage that the MIB overlay structure allows the users to access both the existing OIDs and the OIDs corresponding to the MIB overlay structure. Further, creating and defining the overlay structure for MIB is especially useful for large MIB.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for logically grouping Simple Network Management Protocol (SNMP) Management Information Bases (MIB), the method comprising:
   introducing a first table specifying a first MIB overlay;
   populating the first table with entries, wherein each of the entries includes an object identifier (OID) of a mount point and an OID of a mount target;
   selecting between existing OIDs and OIDs corresponding to the first MIB overlay; and
   specifying an agent infrastructure to support an overlay structure for the MIB by:
      substituting an OID prefix of a mount point with an OID prefix of a mount target referenced by the mount point, while leaving a suffix intact, by an agent of a managed device, when the agent receives a request for an OID of the mount target;

substituting the OID prefix of the mount target with the OID prefix of the mount point, by the agent, when the agent sends a response to the request; and substituting other existing OID prefixes with the OIDs corresponding to the first MIB overlay, by the agent, when the first MIB overlay is selected;

introducing a second table specifying a second MIB overlay;

populating the second table with entries, wherein each of the entries in the second table includes an object identifier (OID) of a mount point and an OID of a mount target;

selecting between existing OIDs and OIDs corresponding to the second MIB overlay;

using the agent infrastructure to support an overlay structure for the second MIB overlay; and substituting other existing OID prefixes with the OIDs corresponding to the second MIB overlay, by the agent, when the second MIB overlay is selected.

2. The method of claim 1, comprising enabling users of a Simple Network Management Protocol (SNMP) to configure one or more of the first and the second MIB overlays.

3. The method of claim 2, comprising presenting the users of the SNMP with a hierarchical view of the OIDs in a tree-like structure.

4. The method of claim 3, comprising facilitating resources to enable the users of the SNMP to mount a sub-tree structure of at least some of the OIDs.

5. The method of claim 1, comprising:
specifying a third MIB overlay in the first table;
selecting between existing OIDs and OIDs corresponding to the third MIB overlay; and
using the agent infrastructure to support an overlay structure for the third MIB overlay.

6. The method of claim 5, comprising substituting other existing OID prefixes with the OIDs corresponding to the third MIB overlay, by the agent, when the third MIB overlay is selected.

7. The method of claim 6, comprising enabling users of a Simple Network Management Protocol (SNMP) to configure one or more of the first, second and third MIB overlays.

8. The method of claim 7, comprising presenting the users of the SNMP with a hierarchical view of the OIDs in a tree-like structure.

9. The method of claim 8, comprising facilitating resources to enable the users of the SNMP to mount a sub-tree structure of at least some of the OIDs.

10. The method of claim 1, comprising defining the MIB overlay as a hierarchical overlay structure.

11. The method of claim 1, comprising specifying multiple MIB overlays that include a table of tables with MIB overlays.

12. The method of claim 1, comprising populating at least one of the first table and the second table with the entries at a time of initializing a network device.

13. The method of claim 12, comprising designating the entries included in at least one of the first table and the second table as read-only entries.

14. The method of claim 1, comprising specifying at least one of the first MIB overlay and the second MIB overlay such that there is only one mount point per mount target.

15. The method of claim 1, comprising specifying at least one of the first MIB overlay and the second MIB overlay such that for a condition where there are multiple mount points referring to a same mount target, the mount point with a longest prefix of the mount target is selected.

16. The method of claim 1, further comprising specifying at least one of the first MIB overlay and the second MIB overlay such that the OID of the mount point does not coincide with the OID of the mount target.

17. A machine-readable non-transitory medium including instructions executable by a processor for logically grouping Simple Network Management Protocol (SNMP) Management Information Bases (MIB), the machine-readable medium comprising one or more instructions that are configured to cause the processor to perform operations comprising:

introducing a first table specifying a first MIB overlay;

populating the first table with entries, wherein each of the entries includes an object identifier (OID) of a mount point and an OID of a mount target;

selecting between existing OIDs and OIDs corresponding to the first MIB overlay; and specifying an agent infrastructure to support an overlay structure for the MIB by:

substituting an OID prefix of a mount point with an OID prefix of a mount target referenced by the mount point, while leaving a suffix intact, by an agent of a managed device, when the agent receives a request for an OID of the mount target;

substituting the OID prefix of the mount target with the OID prefix of the mount point, by the agent, when the agent sends a response to the request; and substituting other existing OID prefixes with the OIDs corresponding to the first MIB overlay, by the agent, when the first MIB overlay is selected;

introducing a second table specifying a second MIB overlay;

populating the second table with entries, wherein each of the entries in the second table includes an object identifier (OID) of a mount point and an OID of a mount target;

selecting between existing OIDs and OIDs corresponding to the second MIB overlay;

using the agent infrastructure to support an overlay structure for the second MIB overlay; and substituting other existing OID prefixes with the OIDs corresponding to the second MIB overlay, by the agent, when the second MIB overlay is selected.

18. The machine-readable non-transitory medium of claim 17, wherein the one or more instructions are configured to cause the processor to perform operations comprising enabling users of a Simple Network Management Protocol (SNMP) to configure one or more of the first and the second MIB overlays.

19. The machine-readable non-transitory medium of claim 18, wherein the one or more instructions are configured to cause the processor to perform operations comprising presenting users of the SNMP with a hierarchical view of the OIDs in a tree-like structure.

20. The machine-readable non-transitory medium of claim 19, wherein the one or more instructions are configured to cause the processor to perform operations comprising facilitating users of the SNMP to mount a sub-tree structure of at least some of the OIDs.

21. The machine-readable non-transitory medium of claim 17, wherein the one or more instructions are configured to cause the processor to perform operations comprising specifying multiple MIB overlays that include a table of tables with MIB overlays.

22. The machine-readable non-transitory medium of claim 17, wherein the one or more instructions are configured to cause the processor to perform operations comprising specifying at least one of the first MIB overlay and the second MIB overlay such that there is only one mount point per mount target.

23. The machine-readable non-transitory medium of claim 17, wherein the one or more instructions are configured to cause the processor to perform operations comprising specifying at least one of the first MIB overlay and the second MIB overlay such that for a condition where there are multiple mount points referring to a same mount target, the mount point with a longest prefix of the mount target is selected.

24. The machine-readable non-transitory medium of claim 17, wherein the one or more instructions are configured to cause the processor to perform operations comprising specifying at least one of the first MIB overlay and the second MIB overlay such that the OID of the mount point does not coincide with the OID of the mount target.

25. A system for creating an overlay structure for Management Information Bases (MIB), the system comprising:
   an allocating unit for creating a table specifying a MIB overlay;
   an indexing unit for populating the table with entries, wherein each of the entries specifies an object identifier (OID) of a mount point and an OID of a mount target;
   a configuring unit for allowing selection between existing OIDs and OIDs corresponding to the MIB overlay;
   an agent infrastructure for supporting the overlay structure for the MIB;
   a non-transitory machine-readable medium including instructions executable by a processor, the instructions configured to cause the processor to perform operations comprising:
      introducing a first MIB overlay, the first MIB overlay comprising a first table specifying the first MIB overlay;
      populating the first table with entries, wherein each of the entries specifies an OID of a mount point and an OID of a mount target;
      selecting between existing OIDs and OIDs corresponding to the first MIB overlay;
      introducing a second table specifying a second MIB overlay;
      populating the second table with entries, wherein each of the entries in the second table includes an OID of a mount point and an OID of a mount target;
      selecting between existing OIDs and OIDs corresponding to the second MIB overlay; and
      specifying an agent infrastructure to support an overlay structure for the first MIB overlay and the second MIB overlay; and
   a graphical user interface for presenting on a display of the system, the graphical user interface being configured to:
      enable users of a Simple Network Management Protocol (SNMP) to configure one or more of the first and the second MIB overlays;
      present the users of the SNMP with a hierarchical view of the OIDs in a tree-like structure; and
      facilitate resources to enable the users of the SNMP to mount a sub-tree structure of at least some of the OIDs.

* * * * *